(12) United States Patent
Kuo

(10) Patent No.: US 8,504,324 B2
(45) Date of Patent: Aug. 6, 2013

(54) SYSTEM AND METHOD FOR ANALYZING RELIABILITY OF ELECTRONIC DEVICE

(75) Inventor: Szu-Wei Kuo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 348 days.

(21) Appl. No.: 12/969,420

(22) Filed: Dec. 15, 2010

(65) Prior Publication Data
US 2012/0029872 A1 Feb. 2, 2012

(30) Foreign Application Priority Data
Jul. 29, 2010 (TW) .................................. 99125016

(51) Int. Cl.
G06F 17/18 (2006.01)
(52) U.S. Cl.
USPC ............. 702/179; 702/147; 702/181; 714/37; 714/47.1; 714/47.2; 714/46; 703/2; 703/14; 700/99; 700/105; 700/106
(58) Field of Classification Search
USPC .................. 702/147, 179, 184, 186, 187, 181, 702/182; 714/37, 47, 46, E11.02, 47.1, 47.2; 703/2, 14; 700/99, 105, 106
See application file for complete search history.

(56) References Cited

U.S. PATENT DOCUMENTS

| | | | | |
|---|---|---|---|---|
| 6,684,349 | B2 * | 1/2004 | Gullo et al. | 714/47.2 |
| 7,120,566 | B1 * | 10/2006 | Brand et al. | 703/2 |
| 7,149,673 | B1 * | 12/2006 | Brand et al. | 703/14 |
| 7,260,509 | B1 * | 8/2007 | Brand et al. | 703/2 |
| 7,596,727 | B2 * | 9/2009 | Kuo | 714/47.1 |
| 7,610,259 | B2 * | 10/2009 | Yuda et al. | 1/1 |
| 7,867,404 | B2 * | 1/2011 | Deutsch | 216/13 |
| 7,937,176 | B2 * | 5/2011 | Knipfer et al. | 700/99 |
| 2002/0078403 | A1 * | 6/2002 | Gullo et al. | 714/37 |
| 2007/0111525 | A1 * | 5/2007 | Deutsch | 438/689 |
| 2007/0165381 | A1 * | 7/2007 | Kuo | 361/704 |
| 2008/0148365 | A1 * | 6/2008 | Yoshida et al. | 726/4 |
| 2011/0172073 | A1 * | 7/2011 | Chen | 493/293 |

\* cited by examiner

*Primary Examiner* — Carol S Tsai
(74) *Attorney, Agent, or Firm* — Altis Law Group, Inc.

(57) ABSTRACT

A system and method analyze reliability of an electronic device using a computing device. The method generates a component coding rule for components of the electronic device, establishes a BOM table for the electronic device according to the component coding rule, and generates component codes for the components according to the component data. The method further classifies the components into different component types according to the component codes, and calculates a failure rate for each of the components according to a parameter equation, obtains mean time between failures (MTBF) of the electronic device by calculating a sum of the failure rates of all the components. In addition, the method generates a reliability analysis report of the electronic device according to the MTBF of the electronic device. and outputs the reliability analysis report to an output device.

19 Claims, 3 Drawing Sheets

SYSTEM AND METHOD FOR ANALYZING RELIABILITY OF ELECTRONIC DEVICE

BACKGROUND

1. Technical Field

Embodiments of the present disclosure relate to methods and systems for analyzing performances of electronic devices, and particularly to a system and method for analyzing reliability of an electronic device.

2. Description of Related Art

Reliability analysis of manufactured electronic devices can encompass parts count analysis, failure statistical analysis, or failure simulation analysis. Parts count analysis is a first approximation of the calculated reliability of the device, requiring a program to total and summarize count results. Failure simulation analysis examines failure of each component within a computing device to determine the effect on the performance thereof. This analysis is typically performed by using a specialized computer application to simulate a special operating environment and temperature. The failure statistical analysis assures that each component of the device meets its performance specifications, utilizing statistical theory to calculate failure of simple or complex components. As a result, the limitations described need to be addressed.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
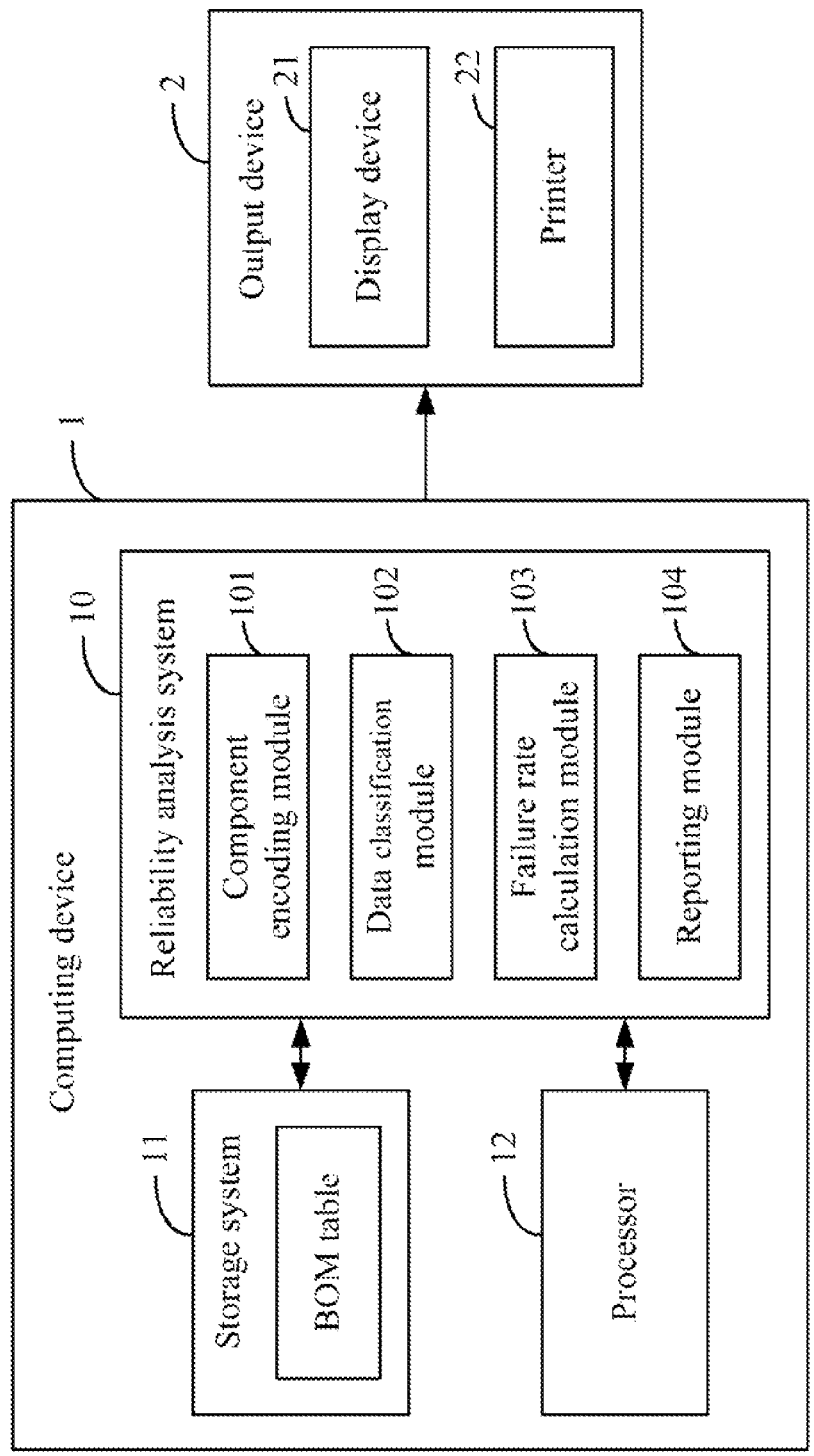
FIG. 1 is a schematic diagram of one embodiment of a computing device comprising a reliability analysis system.

FIG. 1 is a schematic diagram of one embodiment of a computing device 1 comprising a reliability analysis system 10. In the embodiment, the reliability analysis system 10 can classify components of an electronic device according to different component types, analyze mean time between failure rates (MTBF) of the components based on each of the component types, and generate a reliability analysis repot to show the reliability of the electronic device. The components, include, but are not limited to, resistors, capacitors, inductors, transistors, power supplies, and integrated circuits, for example.

The computing device 1, can be, for example, as a desktop computer, a notebook computer, a server, a workstation, or any data processing device. The computing device 1 further includes a storage system 11 and at least one processor 12. The reliability analysis unit 10 may comprise computerized code in the form of one or more programs that are stored in the storage system 11 and executed by the at least one processor 12. It should be understood that FIG. 1 illustrates only one example of the computing device 1, and may include more or fewer components than illustrated, or a different configuration of the various components in other embodiments.

In one embodiment, the computing device 1 connects to an output device 2, which may include a display device 21 and a printer 22. The display device 21 is configured to display the reliability analysis report. The printer 22 is configured to print the reliability analysis repot.

The storage system 11 stores a bill of material (BOM) table that records data on components of the electronic device, such as component specifications, component types, and performance parameters of the components. The performance parameters may include quality parameters, stress parameters, power parameters, temperature parameters, and environment parameters. In one embodiment, the storage system 11 may be an internal storage device, such as a random access memory (RAM) for temporary storage of information, and/or a read only memory (ROM) for permanent storage of information. In some embodiments, the storage system 11 may also be an external storage device, such as an external hard disk, a storage card, or a data storage medium.

The reliability analysis system 10 includes a component coding module 101, a data classification module 102, a failure rate calculation module 103, and a reporting module 104. The modules 101-104 may comprise computerized code in the form of one or more programs that are stored in the storage system 11. The computerized code includes instructions that are executed by the at least one processor 12 to provide functions for implementing the modules 101-104. In general, the word "module," as used herein, refers to logic embodied in hardware or firmware, or to a collection of application instructions, written in a program language. In one embodiment, the program language may be Java or C. One or more application instructions in the modules may be embedded in firmware, such as an EPROM. The modules described herein may be implemented as either application and/or hardware modules and may be stored in any type of computer-readable medium or other storage device.

The component coding module 101 is operable to define a component coding rule for components of the electronic device, establish the BOM table for the electronic device according to the component coding rule, and store the BOM table to the storage system 11. In one embodiment, the component coding rule is defined as a rule used to generate a component code for each of the components, so as to classify the components according to the different component codes. Each of the component codes include a plurality of characters, such as letters and numbers, for example.

Figure 2:
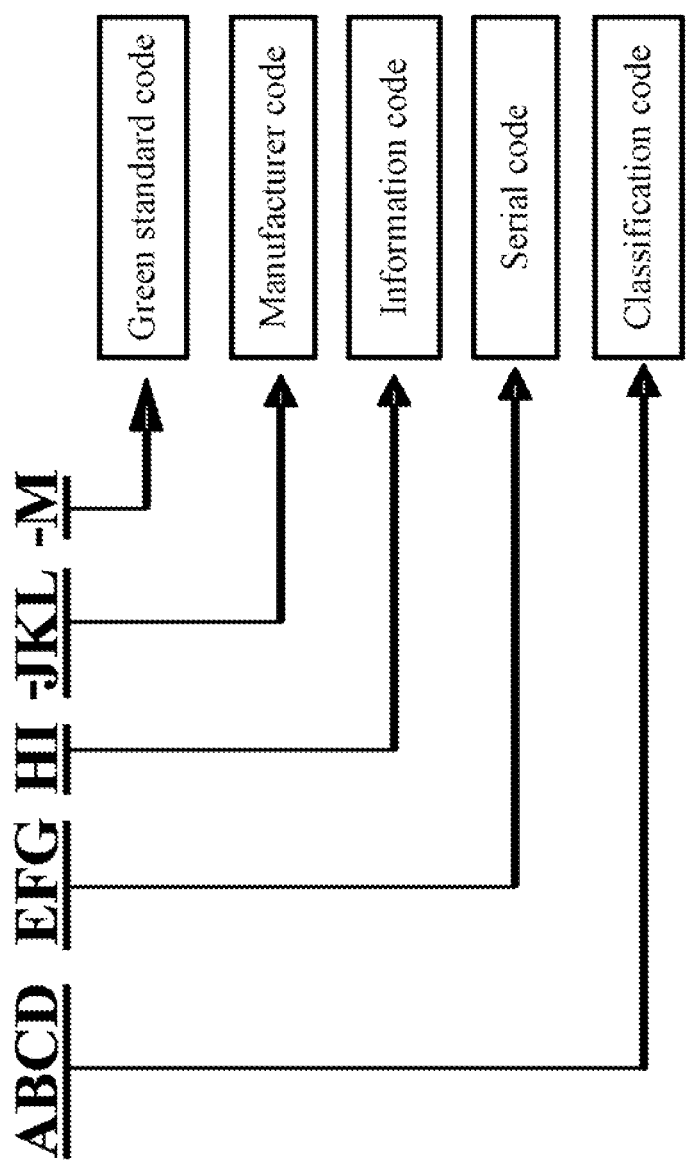
FIG. 2 shows a schematic diagram illustrating one example of a component coding rule for a component of an electronic device.

In one example with respect to FIG. 2, it is assumed that a device code of a component is consisted of the characters "ABCD EFG HI-JKL-M". The characters "ABCD" represent a classification code that includes a class code (the "AB") and a family code (the "CD"), to identify the component according to the classification code. The characters "EFG" represent a serial code used to identify a serial number of the component. The characters "HI" represent an information code used to describe information of the component, which may include a version number, color, and performances of the component. The characters "-JKL" represent manufacture code used to identify a manufacturer of the component, such as the number "012" which indicates that the component is produced by the manufacturer "XXX." The characters "-M" represent a green standard code of the component, such as a RoHS standard. If the component satisfies the green standard, the green standard code may be denoted as a code "-G", otherwise, the If the component does not satisfy the green standard, the green standard code may be denoted as "-N". However, it should be understood that the device code can include letters, numbers, and other symbols, depending on the embodiment.

The data classification module 102 is operable to obtain component data of the components from the BOM table in the storage system 11, generate component codes for the components according to the component data, and determine whether each of the component codes matches the component coding rule. When a component code of the component does not match the component coding rule, the component coding module 101 generates a new component coding rule for the component according to the component data.

The data classification module 102 is further operable to classify the components according to the component codes, and calculate a total number of the components based on each of the component types. In one embodiment, the data classification module 102 can identify a component type of the component according to the classification code, such as the class code and the family code.

The failure rate calculation module 103 is operable to calculate a failure rate for each component according to a parameter equation. The parameter equation may be defined by an industry standard, such as MIL-HDBK-217 a military standard for calculating the MTBF of devices to evaluate reliability of the devices. In one embodiment, the parameter equation is symbolically depicted as $\lambda_p = \lambda_b * \Pi_T * \Pi_P * \Pi_S * \Pi_Q * \Pi_E$, wherein $\lambda_p$ represents a failure rate of a component, $\lambda_b$ represents a basic parameter, $\Pi_T$ represents a temperature parameter, $\Pi_P$ represents a power parameter, $\Pi_S$ represents a stress parameter, $\Pi_Q$ represents a quality parameter, and $\Pi_E$ represents a environment parameter, and * represents a multiplication operation. If the parameters of a resistor are as follows: $\lambda_b = 0.0037$, $\Pi_T = 1.16$, $\Pi_P = 0.339$, $\Pi_S = 1.412$, $\Pi_Q = 10$, and $\Pi_E = 1$, then the failure rate of a resistor is $\lambda_p = 0.0037 * 1.16 * 0.339 * 1.412 * 10 * 1 = 0.02054$.

The failure rate calculation module 103 is further operable to obtain a MTBF of the electronic device by calculating a sum of the failure rates of all the components. In one embodiment, the MTBF of the electronic device $\lambda$ is symbolically depicted as $$\lambda = \sum_{p=1}^{m} \lambda_P,$$

where $\lambda_p$ represents a failure rate of each of component, and m represents a total number of the components.

The reporting module 104 is operable to generate a reliability analysis report of the electronic device according to the MTBF of the electronic device, and output the reliability analysis report to the output device 2. As such, the reliability analysis report can be displayed on the display device 21, or printed by the printer 22.

Figure 3:
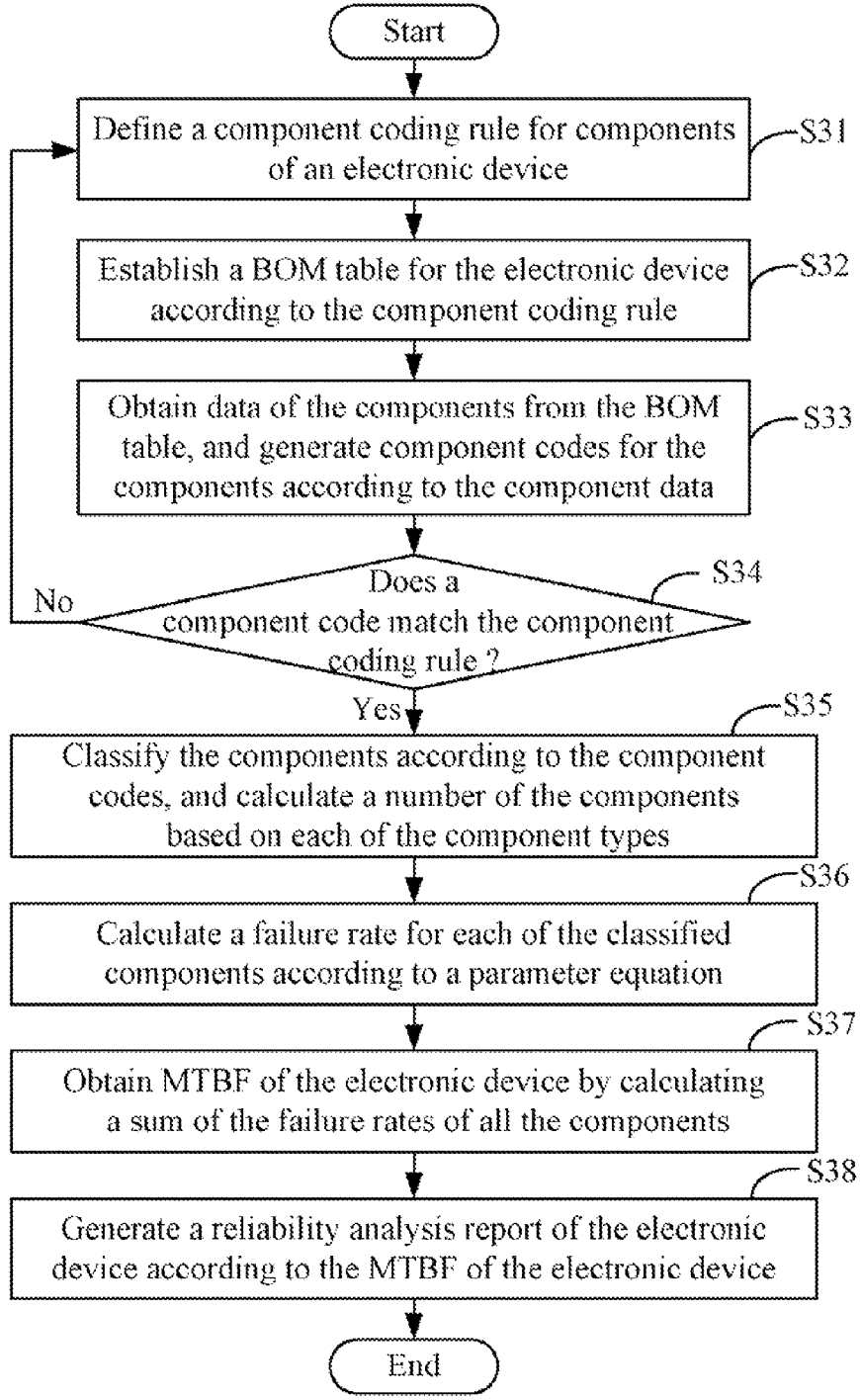
FIG. 3 is a flowchart of one embodiment of a method for analyzing reliability of an electronic device using a reliability analysis system such as, for example, that of FIG. 1.

FIG. 3 is a flowchart of one embodiment of a method for analyzing reliability of an electronic device using a system, such as the system 10 of FIG. 1, for example. In the embodiment, the method provides classification of components of the electronic device according to different component types, and analyzes mean time between failures (MTBF) of the components based on each of the component types. Depending on the embodiment, additional blocks may be added, others removed, and the ordering of the blocks may be changed.

In block S31, the component coding module 101 defines a component coding rule for components of the electronic device. In one embodiment, the component coding rule is defined as a rule used to generate a component code for each of the components, so as to classify the components according to the different component codes. As mentioned, each of the component codes include a plurality of characters, such as letters and numbers. In one example of FIG. 2, the component code may include a classification code, a serial code, an information code, a manufacture code, and a green standard code.

In block S32, the component coding module 101 establishes a BOM table for the electronic device according to the component coding rule, and stores the BOM table to the storage system 11. The BOM table records data on components of the electronic device, such as component specifications, component types, and performance parameters of the components. The performance parameters may include quality parameters, stress parameters, power parameters, temperature parameters, and environment parameters.

In block S33, the data classification module 102 obtains the component data of each of the components from the BOM table, and generates a component code for each of the components according to the component data In block S34, the data classification module 102 determines whether each of the component codes matches the component coding rule. If the component code does not match the product coding rule, block S31 is repeated to generate a new component coding rule for the component according to the component data. Otherwise, if the component code matches the component coding rule, block S35 is implemented.

In block S35, the data classification module 102 classifies the components into different component types according to the component codes, and calculates a total number of the components based on each of the component types. In one embodiment, the data classification module 102 can identify the type of the component according to the classification code that comprises a class code and a family code.

In block S36, the failure rate calculation module 103 calculates a failure rate for each of the components based on the component type according to a parameter equation. The parameter equation may be defined by an industry standard, such as MIL-HDBK-217 a military standard for the calculation of mean time between failures (MTBF) of devices to evaluate reliability of the devices. In one embodiment, the parameter equation is symbolically depicted as $\lambda_p = \lambda_b * \Pi_T * \Pi_P * \Pi_S * \Pi_Q * \Pi_E$, wherein $\lambda_p$ represents a failure rate of a component, $\lambda_b$ represents a basic parameter, $\Pi_T$ represents a temperature parameter, $\Pi_P$ represents a power parameter, $\Pi_S$ represents a stress parameter, $\Pi_Q$ represents a quality parameter, and $\Pi_E$ represents a environment parameter, and * represents a multiplication operation.

In block S37, the failure rate calculation module 103 calculates a sum of the failure rates of all the components to obtain the MTBF of the electronic device. In the embodiment, the MTBF of the electronic device $\lambda$ is symbolically depicted as $$\lambda = \sum_{p=1}^{m} \lambda_P,$$

where $\lambda_p$ represents a failure rate of each of component, and m represents a total number of the components.

In block S38, the reporting module 104 generates a reliability analysis report of the electronic device according to the MTBF of the electronic device, and outputs the reliability analysis report to the output device 2. As such, the reliability analysis report can be displayed on the display device 21, or printed by utilizing the printer 22.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device for analyzing reliability of an electronic device, the computing device being connected to an output device, the computing device comprising:
    a storage system;
    at least one processor; and
    one or more programs stored the storage system and executable by the least one processor, the one or more programs comprising:
    a component coding module operable to define a component coding rule for components of the electronic device, and establish a bill of material (BOM) table for the electronic device according to the component coding rule;
    a data classification module operable to obtain component data of the components from the BOM table, and generate component codes for the components according to the component data, wherein each of the component codes comprises a classification code comprising a family code and a class code, and the data classification module further identifies a component type of each of the components according to the classification codes, and classifies the components into the component types according to the component codes;
    a failure rate calculation module operable to calculate a failure rate for each of the classified components according to a parameter equation, and calculate a sum of the failure rates of all the components to obtain mean time between failures (MTBF) of the electronic device; and
    a reporting module operable to generate a reliability analysis report of the electronic device according to the MTBF of the electronic device, and output the reliability analysis report to the output device.

2. The computing device according to claim 1, wherein the data classification module is further operable to determine whether a component code of each of the components matches the component coding rule.

3. The computing device according to claim 2, wherein the component coding module generates a new component coding rule for the component according to the component data if the component code of the component does not match the component coding rule.

4. The computing device according to claim 1, wherein the output device comprises a display device for displaying the reliability analysis report, and a printer for printing the reliability analysis repot.

5. The computing device according to claim 1, wherein the parameter equation is defined by an industry standard for calculating the MTBF of the electronic device to evaluate reliability of the electronic device.

6. The computing device according to claim 1, wherein each of the component codes further comprises a serial code, an information code, a manufacture code, and a green standard code.

7. The computing device according to claim 1, wherein the BOM table records performance parameters of each of the components, and the performance parameters comprise quality parameters, stress parameters, power parameters, temperature parameters, and environment parameters.

8. A computer-based method for analyzing reliability of an electronic device, the method comprising:
    defining a component coding rule for components of the electronic device;
    establishing a bill of material (BOM) table for the electronic device according to the component coding rule;
    obtaining data of the components from the BOM table, and generating component codes for the components according to the component data, wherein each of the component codes comprises a classification code comprising a family code and a class code;
    identifying a component type of each of the components according to the classification codes, and classifying the components into the component types according to the component codes;
    calculating a failure rate for each of the classified components according to a parameter equation;
    calculating a sum of the failure rates of all the components to obtain mean time between failures (MTBF) of the electronic device;
    generating a reliability analysis report of the electronic device according to the MTBF of the electronic device; and
    outputting the reliability analysis report to an output device.

9. The method according to claim 8, further comprising:
    determining whether a component code of each of the components matches the component coding rule; and
    generating a new component coding rule for the component according to the component data if the component code of the component does not match the component coding rule.

10. The method according to claim 8, further comprising:
    displaying the reliability analysis report on a display device of the output device; or
    printing the reliability analysis to a printer of the output device.

11. The method according to claim 8, wherein the parameter equation is defined by an industry standard for calculating the MTBF of the electronic device to evaluate reliability of the electronic device.

12. The method according to claim 8, wherein each of the component codes further comprises a serial code, an information code, a manufacture code, and a green standard code.

13. The method according to claim 8, wherein the BOM table records performance parameters of each of the components, and the performance parameters comprise quality parameters, stress parameters, power parameters, temperature parameters, and environment parameters.

14. A non-transitory storage medium having stored thereon instructions that, when executed by at least one processor of a computing device, causes the computing device to perform a method for analyzing reliability of an electronic device, the method comprising:
    defining a component coding rule for components of the electronic device;
    establishing a bill of material (BOM) table for the electronic device according to the component coding rule;
    obtaining component data of the components from the BOM table, and generating component codes for the components according to the component data, wherein each of the component codes comprises a classification code comprising a family code and a class code;
    identifying a component type of each of the components according to the classification codes, and classifying the components into the component types according to the component codes;

calculating a failure rate for each of the classified components according to a parameter equation;

calculating a sum of the failure rates of all the components to obtain mean time between failures (MTBF) of the electronic device;

generating a reliability analysis report of the electronic device according to the MTBF of the electronic device; and outputting the reliability analysis report to an output device.

15. The storage medium according to claim 14, wherein the method further comprises:

determining whether a component code of each of the components matches the component coding rule; and generating a new component coding rule for the component according to the component data if the component code of the component does not match the component coding rule.

16. The storage medium according to claim 14, wherein the method further comprises:

displaying the reliability analysis report on a display device of the output device; or printing the reliability analysis to a printer of the output device.

17. The storage medium according to claim 14, wherein the parameter equation is defined by an industry standard for calculating the MTBF of the electronic device to evaluate reliability of the electronic device.

18. The storage medium according to claim 14, wherein each of the component codes further comprises a serial code, an information code, a manufacture code, and a green standard code.

19. The storage medium according to claim 14, wherein the BOM table records performance parameters of each of the components, and the performance parameters comprise quality parameters, stress parameters, power parameters, temperature parameters, and environment parameters.

* * * * *